(No Model.) 4 Sheets—Sheet 1.

R. B. FRANKLIN.
CORN CUTTER AND SHOCKER.

No. 558,059. Patented Apr. 14, 1896.

Witnesses:
R. J. Jacker.
E. A. Duggan.

Inventor:
Revel B. Franklin
By Chas. C. Tillman Atty.

(No Model.) 4 Sheets—Sheet 2.
R. B. FRANKLIN.
CORN CUTTER AND SHOCKER.
No. 558,059. Patented Apr. 14, 1896.
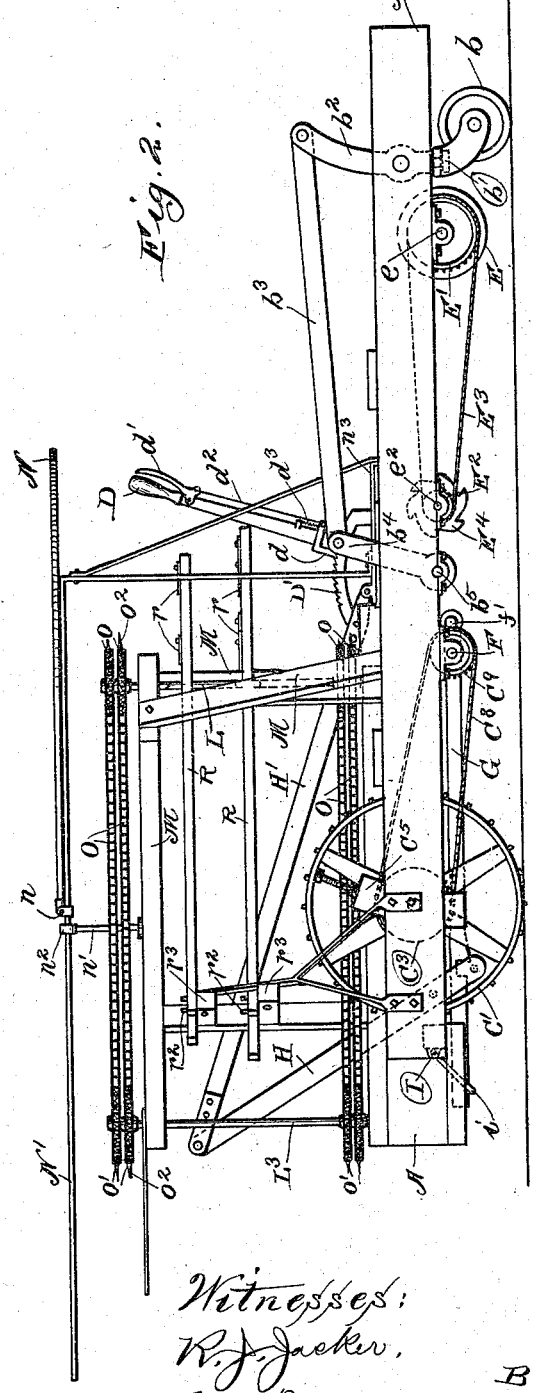
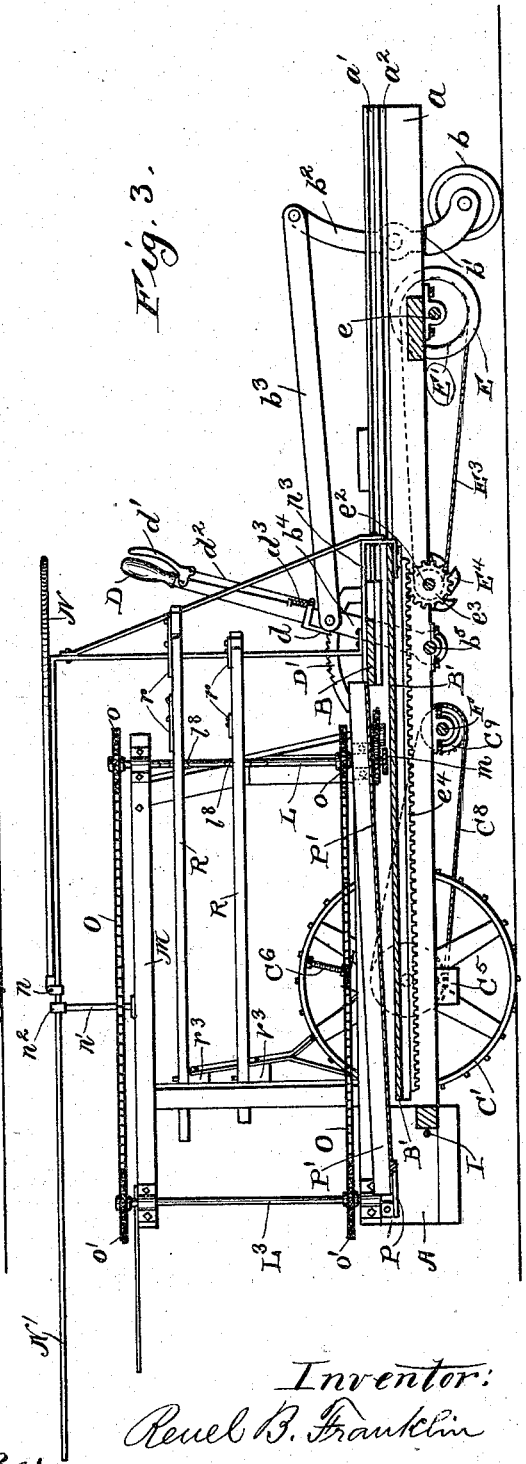

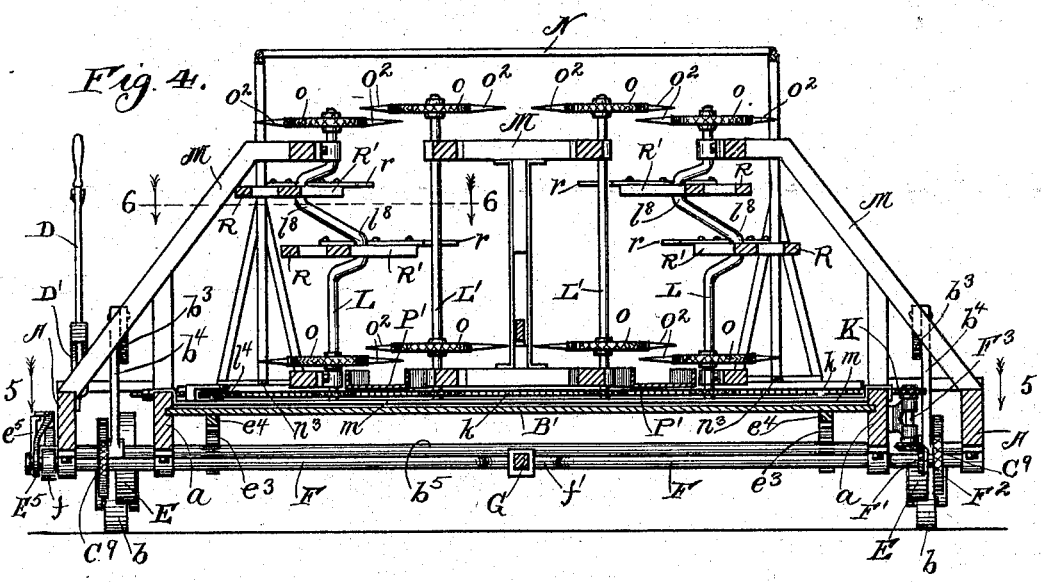

(No Model.)  4 Sheets—Sheet 4.

R. B. FRANKLIN.
CORN CUTTER AND SHOCKER.

No. 558,059. Patented Apr. 14, 1896.

Witnesses:
R. J. Jacker,
E. A. Duggan.

Inventor:
Reuel B. Franklin
By Chas. C. Tillman Atty.

UNITED STATES PATENT OFFICE.

REUEL B. FRANKLIN, OF FORT MADISON, IOWA.

CORN CUTTER AND SHOCKER.

SPECIFICATION forming part of Letters Patent No. 558,059, dated April 14, 1896.

Application filed September 3, 1895. Serial No. 561,280. (No model.)

*To all whom it may concern:*

Be it known that I, REUEL B. FRANKLIN, a citizen of the United States, residing at Fort Madison, in the county of Lee and State of Iowa, have invented certain new and useful Improvements in Corn Cutters and Shockers, of which the following is a specification.

This invention relates to improvements in that class of stalk cutting and shocking machines which are mounted on wheels, and while they are more especially designed to be used for cutting and shocking the stalks of maize, commonly called "corn," yet are also applicable for cutting and shocking sugarcane, broom-corn, ensilage, and like products that are usually planted and grow in rows or rills; and it consists in certain peculiarities of the construction, novel arrangement, and operation of the various parts thereof, as will be hereinafter more fully set forth and specifically claimed.

The objects of my invention are, first, to provide a cutting and shocking machine which shall be simple and inexpensive in construction, strong, and durable, yet effective in operation; second, such a machine which is adapted to gather in and cut off the stalks at the required height from the ground as they stand in rows or in their growing positions, and, third, to hold them in an upright position suitably bound at the top, so as to remain in the field as long as required.

In order to enable others skilled in the art to which my invention pertains to make and use the same, I will now proceed to describe it, referring to the accompanying drawings, in which—

Figure 1:
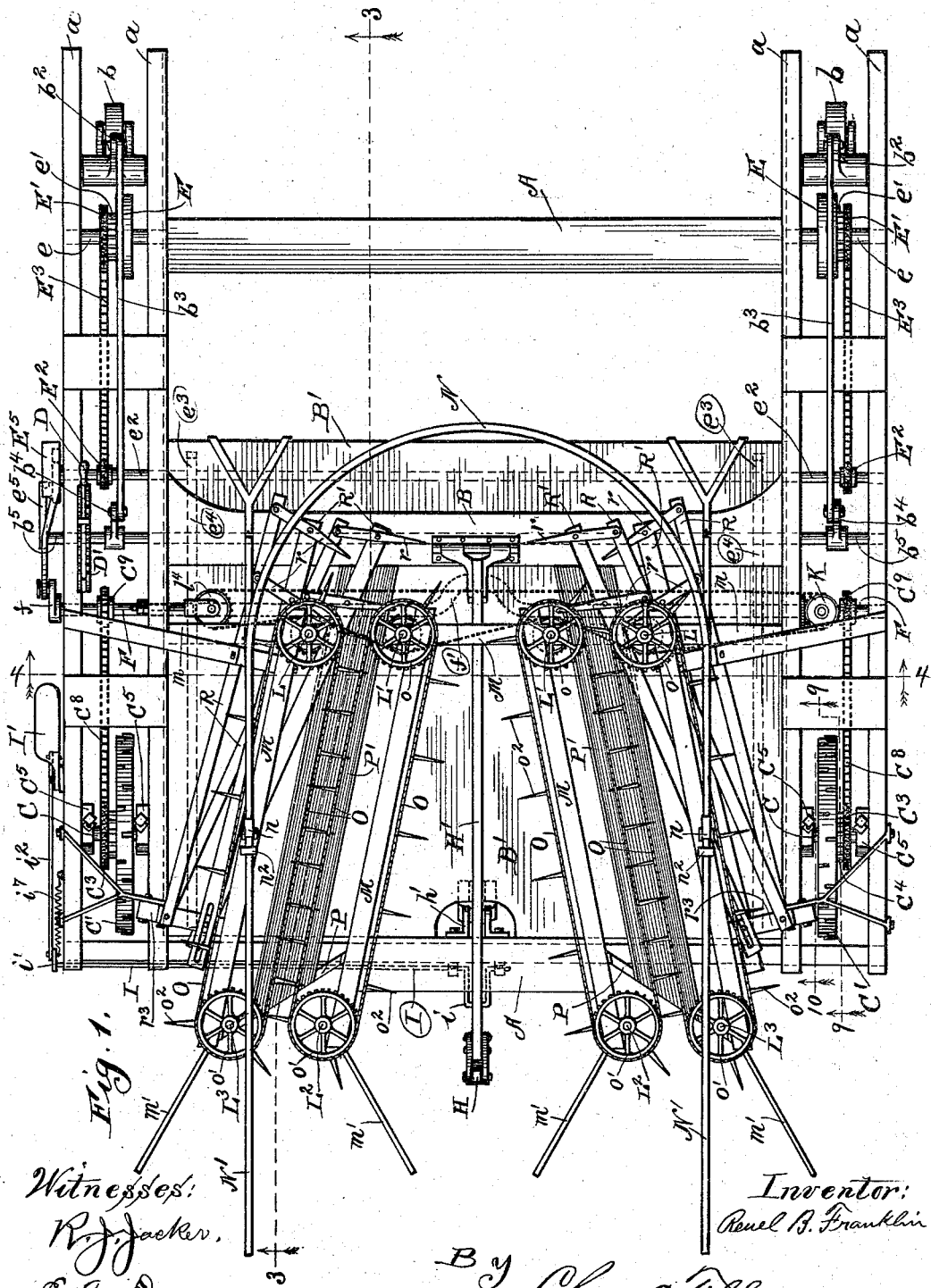
Figure 7:
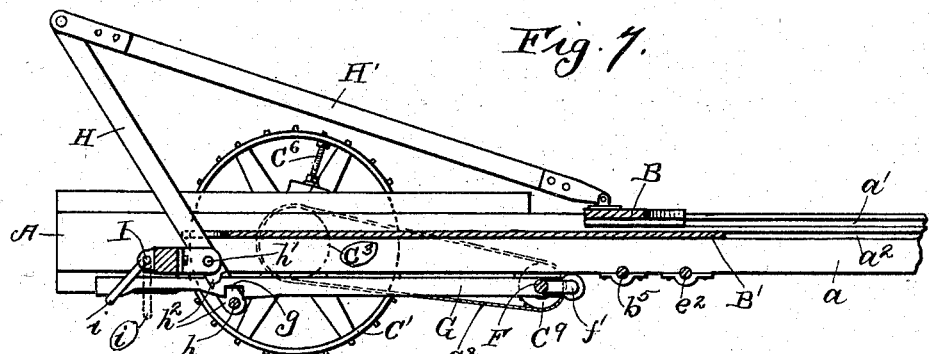
Figure 8:
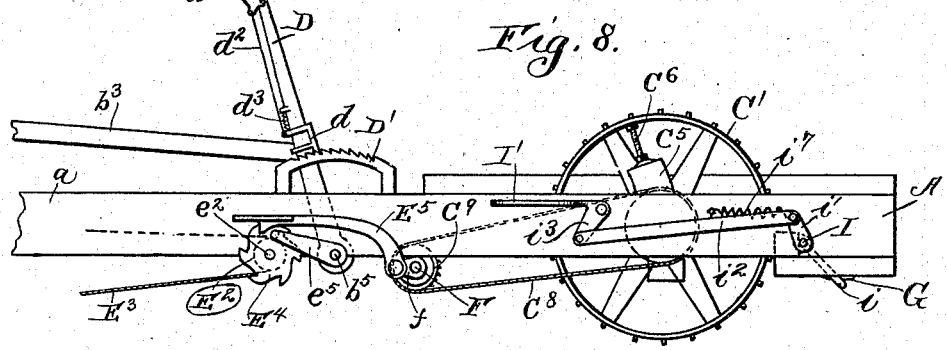
Figure 9:
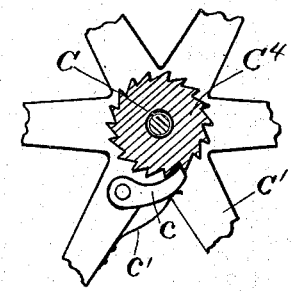
Figure 10:
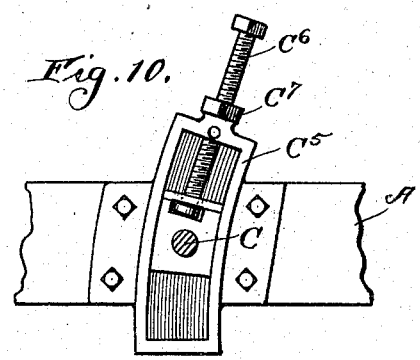

Figure 1 is a plan view of my machine, showing its parts in position when ready for use and to begin cutting. Fig. 2 is a view in side elevation thereof. Fig. 3 is a vertical sectional view taken on line 3 3 of Fig. 1, looking in the direction indicated by the arrows. Fig. 4 is a vertical cross-sectional view taken on line 4 4 of Fig. 1, looking in the direction indicated by the arrows. Fig. 5 is a plan view, partly in section, of a portion of the main frame, showing the means for operating the vertical or conveyer shafts. Fig. 6 is a detail plan view, partly in section, taken on line 6 6 of Fig. 4, showing a part of one of the conveyers and one of the pressers or auxiliary conveyers. Fig. 7 is a longitudinal sectional view of a portion of the machine with parts thereof omitted, but showing the mechanism for operating the discharger. Fig. 8 is a view in elevation of one side of the main frame of the machine, showing the operating-levers and their connections for the platform and casters or rear supporting-wheels of the machine. Fig. 9 is a sectional view taken on line 9 9 of Fig. 1, showing a part of one of the main wheels and the ratchet portion of one of the sprocket-wheels mounted on the shafts with the main wheel; and Fig. 10 is a detail view in elevation, partly in section, showing one of the adjustable journal-boxes for the main wheels.

Similar letters refer to like parts throughout the different views of the drawings.

A represents the main frame of the machine, which is constructed of any suitable size and material, but usually rectangular, as shown in Fig. 1 of the drawings. The sides of the main frame are formed of two parallel pieces $a$, in which the various shafts are journaled and the supporting-wheels have their bearings. The inner parallel pieces $a$ are formed with grooves $a'$ and $a^2$ on their adjacent surfaces for the guidance of the discharger B and sliding platform B', respectively. To the front part of the main frame and near each corner thereof may be attached in any suitable manner the horses for drawing the machine. In the front portion of the frame and on each side thereof are journaled in suitable bearings axles C, upon which are mounted the wheels C' and the sprocket-wheels $C^3$, which are provided with ratchets $C^4$, controlled by the pawls $c$, which are pivoted to the wheels C' and are held in engagement with the ratchets by means of springs $c'$, secured to the last-named wheels.

In the rear portion of the main frame and between the parallel pieces $a$ thereof are located casters or smaller wheels $b$, which are provided with swivel connections $b$ to enable them to turn readily in any direction, and are also supplied with upwardly-extending arms $b^2$, to which are pivotally connected bars $b^3$, united at their other ends to the arms $b^4$, secured on the shaft $b^5$, so that when said shaft is turned by means of the grip-lever D, secured thereon, the casters will be raised between the pieces $a$, thus allowing the idle-wheels E to rest on the ground and drive the sliding platform back to its normal position, as will presently be explained.

The grip-lever is provided with a hand-piece $d'$, fulcrumed thereto at its upper portion, and is connected to the catch $d$ to engage the ratchet $D'$ by means of a rod $d^2$, which releases the catch from said ratchet when the hand-piece is pressed toward the lever, as is well understood. The catch $d$ is held in engagement with the ratchet by means of a spring $d^3$, secured at one end to the lever D and at the other end to said catch.

The idlers or wheels E are mounted on axles $e$, on which are also mounted sprocket-wheels $E'$, which are provided with ratchets $e'$, controlled by means of spring-actuated pawls secured to the adjacent surfaces of the idlers E in a similar manner as that shown in Fig. 9 of the drawings and above set forth in the description of the main or front wheels. The sprocket-wheels $E'$ are connected to other wheels $E^2$ on the shaft $e^2$ by means of sprocket-chains $E^3$, which shaft is journaled transversely in the main frame and is provided near each side thereof with a pinion $e^3$ to engage toothed racks $e^4$, secured longitudinally on the lower surface of the sliding platform, as is clearly shown in Figs. 3 and 4 of the drawings. On one end of the shaft $e^2$ is provided a ratchet $E^4$, which is operated by means of a weighted pawl $E^5$, connected at one of its ends to a crank $f$ on one end of the driving-shaft F, which is journaled transversely in the main frame. The pawl $E^5$ is normally kept in engagement with the ratchet $E^4$ by reason of its weighted end and may be disengaged from said ratchet by means of the dog or projection $e^5$, secured on the end of the shaft $b^5$, to which the grip-lever is secured for turning the same.

The main or driving shaft F is formed at its center with a crank-bend $f'$, to which is secured a bar G, extending under the main frame to near the front end thereof, as is shown in Figs. 2 and 7 of the drawings. Near its free end the bar G is provided with a recess $g$ to engage a pin $h$ in the lever or arm H, which lever is fulcrumed to suitable castings $h'$, secured to the front part of the main frame, and has its lower portion formed with prongs $h^2$ to stride the bar G, which is held in a raised position and out of engagement with the pin $h$, as shown in Fig. 7, by means of a stirrup $i$, formed or provided on the inner end of the rod I, which is loosely and transversely secured on the front part of the main frame. On the outer end of this rod is fixed an arm $i'$, to which is pivotally secured a bar or rod $i^2$, connected at its other end to a projection $i^3$ on a foot-lever $I'$, which is fulcrumed on the side of the main frame, so that by pressing downward on said foot-lever the arm $i'$ will be thrown forward, thus turning the stirrup $i$ and disengaging it from the bar or piece G, when the same will be lowered by reason of its weight and engage in the recess $g$ with the pin $h$ of the lever H, the upper end of which is pivotally connected to a bar $H'$, which extends rearwardly on top of the main frame and is pivoted to the compressor B, at about its middle. The stirrup $i$ is held in engagement with the bar G by means of a spring $i^7$, secured at one of its ends to the main frame and at its other to the piece $i'$.

The sprocket-wheels $C^3$ are connected to the main or driving shaft F by means of sprocket-chains $C^8$, which engage the sprocket-wheels $C^9$, located on the shaft F, near each of its ends. Near one of its ends the shaft F is provided with a beveled gear $F''$, which meshes with a similarly-formed gear $F^2$, journaled on a shaft $F^3$, which is vertically journaled on the main frame and has mounted horizontally on its upper end a sprocket-wheel K, around which passes a sprocket-chain $k$, which engages and operates the sprocket-wheels $l$, $l'$, $l^2$, $l^3$, and $l^4$, employed for driving the conveyer-shafts L and $L'$, on the lower ends of which the wheels $l$ to $l^3$, inclusive, are located. The wheel $l^4$ has its bearings in the block or piece $l^5$, secured on the end of a rod or screw $l^6$, which extends through one of the pieces $a$ of the main frame and is secured by means of a nut $l^7$, which furnishes a convenient means for adjusting the tension of the chain $k$, for it is obvious that by tightening or loosening the nut on the bolt or screw $l^6$ the chain will be made taut or slack.

By reference to Fig. 5 of the drawings it will be seen that the chain $k$ passes on one side of the periphery of the wheels $l$ and $l^2$ and on the other side of the wheels $l'$ and $l^3$. In other words, it is arranged to pass between said wheels, thus causing the pairs $l$, $l'$, $l^2$ and $l^3$ to turn toward each other. The shafts L and $L'$, on the lower ends of which the sprocket-wheels now under consideration are located, rest at their lower ends on the piece $m$, which extends across the main frame just in front of the discharger B and is secured to the inner parallel pieces $a$ of the frame. On the upper surface of the main frame is secured an upright frame M, which supports the conveyer-shafts L and $L'$, as well as forming a partial support for the sliding yoke N, which is formed with an outward bend toward the rear portion of the machine and is secured by means of hinges $n$ or otherwise to the horizontal parallel bars $N'$, which are movably secured on top of the frame M by means of standards $n'$, having in their upper ends eyes or openings $n^2$ for the operation of the rod. The rear portions of the rods $N'$ are bent vertically and are secured at their lower ends to suitable fastenings $n^3$ on the edges of the sliding platform, so that they may travel therewith, thus carrying the bent or curved yoke with them, and as the said yoke is hinged to the horizontal rods or bars it may be lifted from over the top of the stalks.

As is clearly shown in Figs. 1, 4, and 6 of the drawings, the conveyer-shafts L and $L'$ are provided near their upper and lower ends with sprocket-wheels o, which are connected by means of suitable chains O with similar wheels $o'$, likewise mounted on vertical shafts $L^2$ and $L^3$ in the front of the machine. As is clearly shown in the last-named figures, the chains O are provided with fingers $o^2$ to engage the stalks as the machine is driven forward and to retain them in a vertical position and convey them rearwardly. As shown in Fig. 1 of the drawings, the upright frame M is provided with arms or projections $m'$, which diverge and are used for gathering in the leaning stalks and guiding them toward the conveyer-chains.

Just above the main frame and slightly to the rear of the front conveyer-shafts are secured in a diagonal position in any suitable manner knives P, which by reason of their diagonal position are presented to the stalks so as to sever them with a shearing cut. Extending from the knives P to the front edge of the discharger B and between the conveyer-shafts are troughs $P'$, made of sheet metal or other suitable material, and are for the guidance of the butt-ends of the stalks in their passage to the rear of the machine. On the front part of the upright frame M and somewhat to one side of each of the conveyers are pivotally secured horizontal bars R, which are united at their rear ends to similar bars $R'$ by means of fingers $r$, which are pivotally secured on the upper surface of said bars. The front ends of the bars $R'$ are provided with a longitudinal slot $r'$ for the reception and operation of a pin $r^2$, secured on the brace-pieces $r^3$ of the upright frame. Near their rear ends the bars $R'$ are secured to the conveyer-shafts L, which are formed with double cranks or bends $l^8$ and have such a bar so secured at each bend. The bars R and $R'$, provided with the pivoted fingers $r$, constitute an auxiliary conveyer or releasing device and are adapted to engage the stalks at about the rear portion of the conveyers and push them rearwardly against the yoke.

By reference to Fig. 6 of the drawings it will be seen and readily understood that as the shafts L turn the bars $R'$, being secured to the bends or cranks thereof, will be caused to move back and forth, the slot $r'$ permitting such a movement, and the fingers $r$, united to the bar R, will assume the positions indicated by dotted lines in said figure. In order to adjust the machine so as to cut the stalks at any suitable height, the axles C of the main or driving wheels $C'$ are mounted in link-boxes $C^5$ and are provided with adjusting-screws $C^6$ and nuts $C^7$, so that the said axles may be raised and lowered, as is obvious.

From the foregoing and by reference to the drawings it will be seen and readily understood that in the forward movement of the machine the arms $m'$ will stride the rows of stalks and guide them to the rotating front conveyer-wheels $o'$, when the fingers $o^2$ on the conveyer-chains will seize the stalks near their upper portions and also just above the knives P, thus holding them in an upright position and firmly against the knives, which, as before stated, are presented to the stalks diagonally and readily cut the same. The conveyers then carry the severed stalks to the rear, and just when they are about to pass from between the rear conveyer-wheels the fingers $r$ of the auxiliary conveyers will engage them by reason of the rotation of the double crank-shafts and push them backward against the yoke N and onto and beyond the discharger-piece B. As these auxiliary conveyers continue to push the severed stalks against the yoke, the same being fixed to the sliding platform will gradually recede by reason of the action of the weighted pawl $E^5$ on the ratchet $E^4$, which operates the shaft $e^2$, on which the pinions $e^3$ are keyed, that mesh with the racks $e^4$ on the lower surface of the platform. When a sufficient quantity of stalks shall have been gathered into the yoke to make a shock of a suitable or desired size, a piece of binding-twine may be passed thereover and tied, when the discharger B may be caused to push the lower ends of the stalks to the rear by the operator placing his foot on the foot-lever $I'$, then disengaging the stirrup $i$ from the bar G, permitting it to engage the lever H and forcing the bar $H'$ and discharger B backward, at which time the hinged portion of the yoke N may be raised, so as to pass over the top of the stalks. As soon as the stalks have been deposited on the ground and the piece B returned to its normal position the foot may be removed from the lever $I'$, when the spring $i^7$ will turn the rod I and cause the stirrup $i$ to lift the bar G out of engagement with the lower end of the lever H, when the casters may be raised by means of the grip-lever D, thus allowing the idlers E to roll on the ground, which operation will force the platform $B'$ to its normal position by reason of the engagement of the racks $e^4$ with the pinions $e^3$, employed for said purpose.

While I have shown two sets of conveyers with their rear ends converging so as to bunch the stalks in the bend of the yoke, yet I may employ one or more sets, and I may sometimes omit the auxiliary conveyers.

Having thus fully described my invention, what I claim as new, and desire to secure by Letters Patent, is—

1. The combination of a wheeled main frame, with a sliding platform thereon provided with toothed rack-bars on its lower surface, the adjustable casters or rear wheels to lower the rear portion of the frame, the pinions to engage the rack-bars, and the idle-wheels having a connection with said pinions and adapted to rest upon the ground when the platform is lowered and to return the sliding platform to its normal position, substantially as described.

2. The combination with a wheeled main frame provided with knives in its front portion, of a sliding platform thereon, having on its lower surface rack-bars, the driving-shaft having on one of its ends a crank and a connection with the driving or main wheels, a pawl secured on said crank, the shaft $e^2$, journaled crosswise on the main frame, pinions on said shaft to engage the rack-bars, a ratchet-wheel on the end of said shaft and adapted to be operated by the pawl, to drive the sliding platform rearward, substantially as described.

3. The combination with a wheeled main frame provided with a stalk cutting and conveying mechanism, of a sliding platform provided on its lower surface with rack-bars, the main or driving shaft having on one of its ends a crank, a pawl secured to said crank, the main or driving wheels of the frame having a connection with the main shaft, the shaft $e^2$, journaled crosswise on the main frame, pinions on said shaft to engage the rack-bars, a ratchet on the end of said shaft adapted to engage the pawl to drive the sliding platform rearward, the adjustable casters to lower the rear of the frame, and the idle-wheels having a connection with the shaft $e^2$, and adapted to contact with the ground when the platform is lowered and to return the sliding platform to its normal position, substantially as described.

4. The combination with a wheeled main frame of a discharger-piece movably secured thereon, a main or driving shaft journaled in the main frame, and having a crank at its center, a bar on said crank and provided with a recess or catch near its free end, a lever fulcrumed in the main frame and adapted to engage said bar at its lower end, a bar or rod connecting the upper end of said lever and the discharging-piece, substantially as described.

5. The combination with a wheeled main frame, of a discharger-piece movably secured thereon, a main or driving shaft journaled in the main frame, having a crank at its center, a bar on said crank, and provided with a recess or catch near its free end, a lever fulcrumed in the main frame and adapted to engage said bar at its lower end, a bar or rod connecting the upper end of said lever and the discharging-piece, a rod secured horizontally on the main frame and provided at its inner end with a stirrup to engage the free end of the bar on the crank of the main shaft, a spring-actuated compound lever connected to the outer end of the rod and adapted to place the stirrup in engagement with the aforesaid bar or to release the same, substantially as described.

REUEL B. FRANKLIN.

Witnesses:
CHAS. C. TILLMAN,
E. A. DUGGAN.